(12) United States Patent
Bader et al.

(10) Patent No.: US 7,789,011 B2
(45) Date of Patent: Sep. 7, 2010

(54) METHOD FOR OPERATION OF A SELECTOR CYLINDER OF AN ELECTRO-PNEUMATIC SELECTOR UNIT FOR A MOTOR VEHICLE GEARBOX

(75) Inventors: Josef Bader, Friedrichshafen (DE); Martin Miller, Immenstaad (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 392 days.

(21) Appl. No.: 11/914,639

(22) PCT Filed: Apr. 15, 2006

(86) PCT No.: PCT/EP2006/003494

§ 371 (c)(1),
(2), (4) Date: Nov. 28, 2007

(87) PCT Pub. No.: WO2006/122619

PCT Pub. Date: Nov. 23, 2006

(65) Prior Publication Data

US 2008/0153658 A1    Jun. 26, 2008

(30) Foreign Application Priority Data

May 19, 2005    (DE) .................. 10 2005 022 982

(51) Int. Cl.
*A01H 5/02*    (2006.01)
*F15B 13/04*    (2006.01)

(52) U.S. Cl. .......................................... 91/471; 91/448
(58) Field of Classification Search .................... 91/35, 91/51, 444, 445, 448, 454, 471
See application file for complete search history.

(56) References Cited

U.S. PATENT DOCUMENTS 6,705,175 B1 *    3/2004    Klatt .......................... 74/335

FOREIGN PATENT DOCUMENTS

| DE | 19751456 | 5/1999 |
| DE | 10060724 | 6/2002 |
| EP | 1067319 | 1/2001 |
| EP | 1081417 | 3/2001 |
| WO | 2006/000338 | 1/2006 |

* cited by examiner

*Primary Examiner*—Michael Leslie
(74) *Attorney, Agent, or Firm*—Davis & Bujold, P.L.L.C.

(57) ABSTRACT

A method for actuating a shift cylinder (1) of an electro-pneumatic control unit for the gearbox of a motor vehicle. The gearbox comprising a main gearbox, a group gearbox or other shifting elements with detents in at least one of a neutral position and/or a final position(s). The shift cylinder (1) is prefilled with a pressure below the detent actuating force, prior to a gearshift phase of the control unit, such that the gearshift time is reduced.

12 Claims, 1 Drawing Sheet

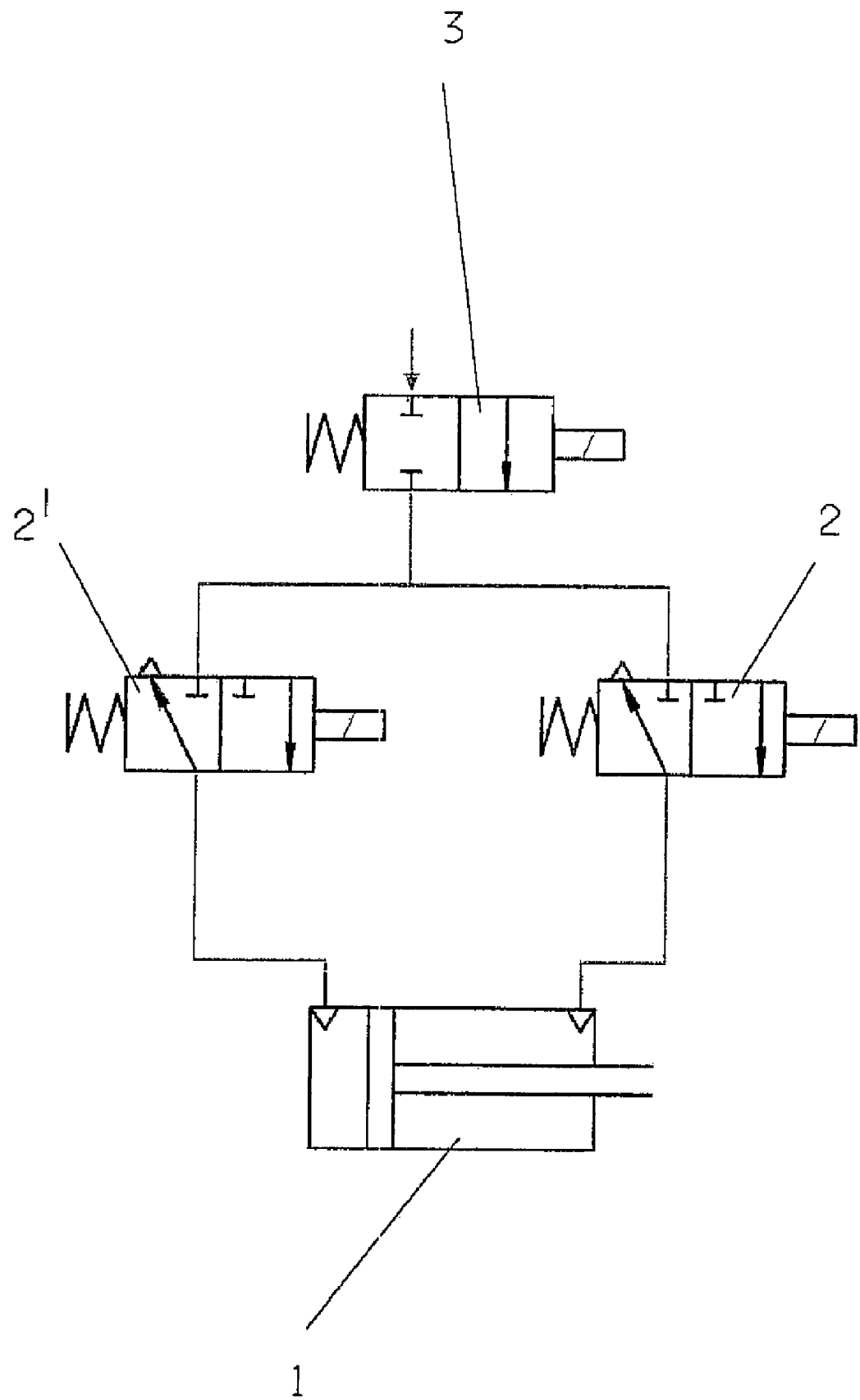

METHOD FOR OPERATION OF A SELECTOR CYLINDER OF AN ELECTRO-PNEUMATIC SELECTOR UNIT FOR A MOTOR VEHICLE GEARBOX

This application is a national stage completion of PCT/EP2006/003494 filed Apr. 15, 2006 which claims priority from German Application Serial No. 10 2005 022 982.4 filed May 19, 2005.

FIELD OF THE INVENTION

The present invention relates to a method for actuating a shift cylinder of an electro-pneumatic control unit of a gearbox of a motor vehicle.

BACKGROUND OF THE INVENTION

Gearboxes of commercial vehicles are divided into a main gearbox, a split group gearbox (GV) and a relay group gearbox (GP). Modern gearboxes, especially in commercial vehicles, have a pneumatically supported control unit, which performs pneumatic shifts in the split group gearbox and in the relay group gearbox, while the shifts in the main part of the gearbox are performed manually by the driver, whereupon the exerted force can be supported by the pneumatic system.

A plurality of prior art devices for the hydraulic and/or pneumatic control of a gearbox and/or shifting element are known.

A device for controlling the adjusting device of a gearbox is known, for example, from EP 1 067 319 B1, which comprises a first pressure medium chamber and a second pressure medium chamber, which are separated from one another by a piston that is movable along its longitudinal axis, to which a first and second controllable valve device are provided that are configured as a 3/2-way valve.

These valve devices optionally connect the pressure medium chambers to a pressure medium source or to a pressure medium sink.

Furthermore, a third controllable valve device is provided, which is connected to the first and second controllable valve device as well as to the pressure medium source so that the pressure medium inlet of the first controllable valve device and the pressure medium inlet of the second controllable valve device can optionally be connected to the pressure medium source or separated from it. In this case, the third controllable valve device is a 2/2-way valve.

SUMMARY OF THE INVENTION

The task of the present invention is to specify a method for actuating a shift cylinder of an electro-pneumatic control unit for the gearbox of a motor vehicle, comprising a main gearbox or group gearbox or other shifting elements with detents in neutral position and/or final positions, by means of which the gearshift time to shift gears between individual gearshift phases can be reduced.

It is thus proposed to prefill the shift cylinder with a pressure below the detent trigger force prior to the corresponding gearshift phase, so that the gearshift time to shift gears in the respective gearshift phase is considerably reduced.

In order to carry out the prefilling according to the present invention, 2/2-way valves are preferably used because the pressure within the cylinder space can be adjusted and maintained in this way. In this case, two 2/2-way valves (for filling and venting) are required for each side of the shift cylinder.

However, according to the present invention it is also possible to carry out the prefilling with 3/2-way valves, namely with valves having three connections and two switch settings, so that only one valve is required for each side of the shift cylinder.

In the case when prefilling is accomplished with 3/2-way valves, adjusting the pressure in the cylinder to the desired pressure level by switching the control valve at the main cylinder between filling and venting is proposed. It should be kept in mind that as a result of previous gearshift phases, the pressure between the main cut-off valve and the 3/2-way valves, configured as control valves, may be higher than the desired prefilling pressure. The pressure should preferably be measured between the main cut-off valve and the control valves.

The pressure required for gear shifting can be adjusted by fully opening the control valves.

If no additional compressive force is needed by the control unit, the desired prefilling pressure in the cylinder can be maintained by pulsing the main cut-off valve and open control valve at the cylinder, the pressure required for gear shifting being adjusted by completely opening the main cut-off valve.

BRIEF DESCRIPTION OF THE DRAWINGS

The present invention is exemplified below in more detail by means of the attached FIGURE, which schematically illustrates an arrangement for carrying out the method according to the present invention.

FIG. 1 is a schematic illustration of a shift cylinder having, on each side of the shift cylinder 1, a 3/2-way valve 2, 2' being provided, which in turn is connected to the main cut-off valve 3, which preferably is a 2/2-way valve.

DETAILED DESCRIPTION OF THE DRAWINGS

As already described, the gearshift time is reduced according to the present invention by prefilling the shift cylinder with a pressure that is below the detent trigger force prior to the gearshift phase.

The shift cylinder 1 is prefilled according to the present invention by switching the respective control valve 2, 2' between filling and venting until the pressure has reached the desired pressure level. If necessary, the desired prefilling pressure is maintained in the shift cylinder 1 by pulsing or pressure holding of the main cut-off valve 3 and open control valve 2, 2' at the shift cylinder 1; the pressure required for gear shifting is adjusted by fully opening the main cut-off valve 3.

REFERENCE NUMERALS

1 Shift cylinder
2 Control valve
2' Control valve
3 Main cut-off valve

The invention claimed is:

1. A method for actuating a shift cylinder (1) of an electro-pneumatic control unit for a gearbox of a motor vehicle having one of a main gearbox and at least one group gearbox, the method comprising the step of:

prior to a corresponding gearshift, prefilling a first side of the shift cylinder (1), via a first 3/2-way valve (2), with a pressure below a detent actuating force in order to reduce a gearshift time, and prefilling a second side of the shift cylinder (1), via a second 3/2-way valve (2'), with a pressure below a detent actuating force in order to reduce a gearshift time;

maintaining a desired prefilling pressure in the shift cylinder (1), by one of pulsing and pressure holding, via a main cut-off valve (3) which is connected to the first 3/2-way valve (2) and the second 3/2-way valve (2'), and opening one of the first 3/2-way valve (2) and the second 3/2-way valve (2') at the shift cylinder (1) to complete the gear shift.

2. The method for actuating the shift cylinder (1) of the electro-pneumatic control unit according to claim 1, further comprising the step of switching the first 3/2-way valve (2) between a filling phase and a venting phase until the pressure reaches a desired pressure level, and switching the second 3/2-way valve (2') between a filling phase and a venting phase until the pressure reaches a desired pressure level.

3. The method for actuating the shift cylinder (1) of the electro-pneumatic control unit according to claim 1, further comprising the step of adjusting a pressure, required for gear shifting, by completely opening the main cut-off valve (3).

4. The method for actuating the shift cylinder (1) of the electro-pneumatic control unit according to claim 2, further comprising the step of adjusting a pressure, required for gear shifting, by completely opening the first 3/2-way valve (2) and the second 3/2-way valve (2').

5. A method for actuating a shift cylinder (1) of an electro-pneumatic control unit for a gearbox of a motor vehicle having a main gearbox and at least one group gearbox, the method comprising the steps of:

prior to a corresponding gearshift so as to reduce a gearshift time, prefilling a first side of the shift cylinder (1), via a first 3/2-way valve (2), with a pressure below a detent actuating force, and prefilling a second side of the shift cylinder (1), via a second 3/2-Way valve (2'), with a pressure below a detent actuating force; and maintaining a desired prefilling pressure in the shift cylinder (1), via a main cut-off valve (3) connected to both the first 3/2-way valve (2) and the second 3/2-way valve (2') by a common fluid line, by one of pulsing and pressure holding; and spring biasing the cut-off valve (3) into a normally closed position which prevents flow through the cut-off valve (3) into the fluid line, and opening at least one of the first 3/2-way valve (2) and the second 3/2-way valve (2') at the shift cylinder (1) to complete the gear shift.

6. The method for actuating the shift cylinder (1) of the electro-pneumatic control unit according to claim 5, further comprising the step of switching the first 3/2-way valve (2) between a filling phase and a venting phase until the pressure on the first side of the shift cylinder (1) reaches a desired pressure level, and switching the second 3/2-way valve (2') between a filling phase and a venting phase until the pressure on the second side of the shift cylinder (1) reaches a desired pressure level.

7. The method for actuating the shift cylinder (1) of the electro-pneumatic control unit according to claim 5, further comprising the step of adjusting a pressure, required for gear shifting, by completely opening the main cut-off valve (3).

8. The method for actuating the shift cylinder (1) of the electro-pneumatic control unit according to claim 6, further comprising the step of adjusting a pressure, required for gear shifting, by completely opening the first 3/2-way valve (2) and the second 3/2-way valve (2').

9. A method for actuating a shift cylinder (1) of an electro-pneumatic control unit for a gearbox of a motor vehicle having a main gearbox and at least one group gearbox, the method comprising the steps of:

prior to a corresponding gearshift so as to reduce a gearshift time, prefilling a first side of the shift cylinder (1), via a first 3/2-way valve (2), with a pressure below a detent actuating force, and prefilling a second side of the shift cylinder (1), via a second 3/2-way valve (2'), with a pressure below a detent actuating force, spring biasing the first 3/2-way valve (2) into a normally closed position which prevents flow from the fluid line through the first 3/2-way valve (2), and spring biasing the second 3/2-way valve (2') into a normally closed position which prevents flow from the fluid line through the second 3/2-way valve (2');

measuring the pressure between the first 3/2-way valve (2) and the second 3/2-way valve (2') and a main cut-off valve (3), which is connected to the first 3/2-way valve (2) and the second 3/2-way valve (2') with a fluid line, and spring biasing the cut-off valve (3) into a normally closed position which prevents flow through the cut-off valve (3) into the fluid line; and maintaining a desired prefilling pressure in the shift cylinder (1), by one of pulsing and pressure holding, via the main cut-off valve (3) and opening one of the first 3/2-way valve (2) and the second 3/2-way valve (2') at the shift cylinder (1) to complete the gear shift.

10. The method for actuating the shift cylinder (1) of the electro-pneumatic control unit according to claim 9, further comprising the step of switching the first 3/2-way valve (2) between a filling phase and a venting phase until the pressure on the first side of the shift cylinder (1) reaches a desired pressure level, and switching the second 3/2-way valve (2') between a filling phase and a venting phase until the pressure on the second side of the shift cylinder (1) reaches a desired pressure level.

11. The method for actuating the shift cylinder (1) of the electro-pneumatic control unit according to claim 9, further comprising the step of adjusting a pressure, required for gear shifting, by completely opening the main cut-off valve (3).

12. The method for actuating the shift cylinder (1) of the electro-pneumatic control unit according to claim 10, further comprising the step of adjusting a pressure, required for gear shifting, by completely opening the first 3/2-way valve (2) and the second 3/2-way valve (2').

* * * * *